(12) United States Patent
Takimoto (10) Patent No.: US 10,103,594 B2
(45) Date of Patent: Oct. 16, 2018

(54) ROTARY MACHINE

(71) Applicant: Top Co., Ltd., Fukui (JP)

(72) Inventor: Toru Takimoto, Fukui (JP)

(73) Assignee: Top Co., Ltd. (JP)

( * ) Notice: Subject to any disclaimer, the term of this patent is extended or adjusted under 35 U.S.C. 154(b) by 354 days.

(21) Appl. No.: 14/894,680

(22) PCT Filed: May 16, 2014

(86) PCT No.: PCT/JP2014/063028
§ 371 (c)(1),
(2) Date: Nov. 30, 2015

(87) PCT Pub. No.: WO2014/192558
PCT Pub. Date: Dec. 4, 2014

(65) Prior Publication Data
US 2016/0111933 A1    Apr. 21, 2016

(30) Foreign Application Priority Data

May 31, 2013 (JP) ................. 2013-116094

(51) Int. Cl.
*H02K 3/34* (2006.01)
*H02K 1/14* (2006.01)
(Continued)

(52) U.S. Cl.
CPC ............. *H02K 3/345* (2013.01); *H02K 1/148* (2013.01); *H02K 3/325* (2013.01); *H02K 3/38* (2013.01); *H02K 3/522* (2013.01)

(58) Field of Classification Search
CPC ................. H02K 3/345; H02K 3/325
See application file for complete search history.

(56) References Cited

U.S. PATENT DOCUMENTS 7,649,295 B2 * 1/2010 Fukui .................... H02K 3/522
                                                310/215
8,487,501 B2 * 7/2013 Oka ....................... H02K 3/522
                                                310/215
(Continued)

FOREIGN PATENT DOCUMENTS

JP    2001112205 A    4/2001
JP    2007252030 A    9/2007
(Continued)

OTHER PUBLICATIONS

International Search Report for Application No. PCT/JP2014/063028 dated Aug. 19, 2014.
(Continued)

*Primary Examiner* — Robert W Horn
(74) *Attorney, Agent, or Firm* — Lerner, David, Littenberg, Krumholz & Mentlik, LLP (57) ABSTRACT

A stator of a rotary machine is provided with a first resin molded body, a second resin molded body and third resin molded bodies which electrically insulate a stator core and coils. The first resin molded body is attached to the stator core on a first side of a lamination direction in which steel sheets are laminated and the second resin molded body is attached to the stator core on a second side of the lamination direction. The third resin molded bodies have shapes extending along slot side surfaces and are provided in a state contacting with a predetermined region of the slot side. First slot side portions of the first resin molded body overlaps end portions of a first side of the third resin molded bodies and second slot side portions of the second molded body overlaps end portions of a second side of the third resin molded bodies.

2 Claims, 6 Drawing Sheets

(51) Int. Cl.
*H02K 3/32* (2006.01)
*H02K 3/52* (2006.01)
*H02K 3/38* (2006.01)

(56) References Cited

U.S. PATENT DOCUMENTS

| | | | |
|---|---|---|---|
| 9,467,018 B2* | 10/2016 | Kitta | H02K 3/522 |
| 9,490,675 B2* | 11/2016 | Kim | H02K 3/34 |
| 9,634,533 B2* | 4/2017 | Uchitani | H02K 3/345 |
| 9,705,373 B2* | 7/2017 | Azusawa | H02K 3/345 |
| 9,722,466 B2* | 8/2017 | Tsuiki | H02K 3/522 |
| 9,774,224 B2* | 9/2017 | Kim | H02K 3/34 |
| 2007/0222324 A1 | 9/2007 | Fukui et al. | |
| 2014/0015349 A1* | 1/2014 | Chamberlin | H02K 3/345 |
| | | | 310/43 |
| 2016/0111933 A1* | 4/2016 | Takimoto | H02K 1/148 |
| | | | 310/43 |

FOREIGN PATENT DOCUMENTS

| | | |
|---|---|---|
| JP | 2007259627 A | 10/2007 |
| JP | 2008061368 A | 3/2008 |
| JP | 2010045868 A | 2/2010 |

OTHER PUBLICATIONS

Office Action corresponding to JP Patent Application No. 2015-519782, dated Jul. 26, 2016, 4 pgs.

* cited by examiner

ROTARY MACHINE

CROSS-REFERENCE TO RELATED APPLICATIONS

The present application is a national phase entry under 35 U.S.C § 371 of International Application No. PCT/JP2014/063028 filed May 16, 2014, which claims priority from Japanese Application No. 2013-116094 filed May 31, 2013, all of which are hereby incorporated herein by reference.

TECHNICAL FIELD

The present invention relates to a rotary machine such as a motor or an electric generator.

BACKGROUND ART

In a stator of a rotary machine such as a motor or an electric generator, a stator core and a coil are electrically insulated. For example, in Patent Literature 1, a stator is disclosed. This stator has a stator core which a plurality of divided cores are connected in an annular ring. A drive coil is wound around to the divided core via a first insulator and a second insulator which are disposed on both sides in a motor axis line direction. Each divided core is covered by a sheet-like third insulator. The drive coil is wound around on the third insulator. The third insulator is a slot insulating paper which is substantially rectangular-shaped. The third insulator is provided with, at an end portion of a circumferential direction, a projecting portion which is projected from the end portion of the circumferential direction of an outer peripheral side circular arc portion of the divided core to both the circumferential direction and the motor axis line direction. In configuring the stator, a salient pole side surface of the divided core, an inner peripheral surface of an inner peripheral side circular arc portion and an inner peripheral surface of the outer peripheral side circular arc portion are covered by the third insulator. Thereafter, the first insulator and the second insulator are overlaid from both sides of the motor axis line direction of the divided core. Both side portions of the motor axis line direction of the third insulator are in a state of being clamped between each surface of the salient pole of the divided core, the inner peripheral side circular arc portion and the outer peripheral side circular arc portion and, each portion of the first insulator and the second insulator.

In Patent Literature 2, an insulation structure of a motor iron core and a winding wire is disclosed. In this insulation structure, insulators are mounted on both ends in an axial direction. The insulator is molded to cover a certain length of an axial direction end surface of a salient pole portion where the winding wire is applied and an axial direction end portion of a slot outer peripheral portion. At the outside of the insulator, an insulating paper which is bended to match the shape of the slot outer peripheral portion is disposed. In this insulation structure, the insulator and the insulating paper are overlapped in a certain length in the axial direction.

CITATION LIST

Patent Literature

PATENT LITERATURE1: JP-A-2010-45868
PATENT LITERATURE2: JP-A-2001-112205

SUMMARY OF INVENTION

Problems to be Solved by the Invention

In a stator of a rotary machine such as a motor or an electric generator, an electrical insulation of a stator core and a coil is secured. An insulating paper as an insulation member is provided in a slot side surface forming a slot of the stator core. In this case, the insulating paper is provided in a state of contacting with the slot side surfaces. A resin molded body as an insulation member formed by resin molding is attached to both sides in a lamination direction of the stator core in the state described previously. In the insulating paper, each end portion on both sides of the lamination direction are sandwiched and supported by resin molded bodies which are attached to the slot side surface and each end surface of the stator core, respectively.

The insulating paper is a resin sheet material. Therefore, rigidity is low. Assuming that the insulating paper is disposed in a state of contacting with the slot side surface, and then, the resin molded body is attached to the end surface of the stator core. In this case, it is assumed that an event such as the insulating sheet is bent or the insulating paper is flipped up from the slot side surface occurs. If such event occurs, it is considered that the resin molded body cannot be smoothly attached. Therefore, in some cases, measures against such event is additionally required.

An object of the present invention is to provide a rotary machine that includes a stator having a structure which can smoothly form an insulating portion that secures an electric insulation of a stator core and a coil.

Solutions to the Problems

An aspect of the present invention is a rotary machine including: a rotor; and a stator, wherein the stator includes: a stator core which is formed by laminating steel sheets, and which includes a ring shaped yoke and a plurality of teeth protruding from the yoke to a side of the rotor; a plurality of coils which are provided to each of the plurality of teeth and are housed in a slot formed between adjacent teeth of the plurality of teeth; a first resin molded body which is attached to the stator core on a first side of a lamination direction in which the steel sheets are laminated, the first resin molded body electrically insulates the stator core and the coils; a second resin molded body which is attached to the stator core on a second side of the lamination direction, the second resin molded body electrically insulates the stator core and the coils, and a third resin molded body which has a shape extending along a slot side surface which forms the slot, the third resin molded body is provided in a state of contacting with a predetermined region of the slot side surface including a center portion of the stator core in the lamination direction, the third resin molded body electrically insulates the stator core and the coils, wherein the first resin molded body includes: a first end surface side portion covering a first end surface of the stator core which is the first side of the lamination direction; and a first slot side portion integrated with the first end surface side portion and is covering a first region of the first side of the lamination direction continuing to the first end surface, the first region is a portion in the lamination direction of the slot side surface, wherein the second resin molded body includes: a second end surface side portion covering a second end surface of the stator core which is the second side of the lamination direction; and a second slot side portion integrated with the second end surface side portion and is covering a second region of the second side of the lamination direction continuing to the second end surface, the second region is a portion in the lamination direction of the slot side surface wherein the first slot side portion overlaps with an end portion of the first side of the lamination direction of the third resin molded body, wherein the second slot side portion overlaps with an end portion of the second side of the lamination direction of the third resin molded body.

According to this, it is possible to improve the rigidity of the third resin molded body as an insulation member for insulating the stator core and the coils in the slot side surfaces. After the third resin molded body arranged in a state of contacting with the stator core, when the first resin molded body and the second resin molded body are attached to both sides in the lamination direction, bending and/or flipping up and the like of the third resin molded body can be suppressed. The first resin molded body and the second resin molded body can be smoothly attached to the stator core. By overlapping the first slot side portion and the third resin molded body, it is possible to extend the insulation distance at this portion. By overlapping the second slot side portion and the third resin molded body, it is possible to extend the insulation distance at this portion. In the above description, the "first resin molded body", the "second resin molded body" and the "third resin molded body" mean that each of them are insulation members molded in a desired shape by injecting and filling resin in cavities formed inside dies such as metal dies. Thus, for example, an insulation member which is formed by performing bending process and the like against an insulating sheet formed of a resin material is not included in the "third resin molded body".

In this rotary machine, in each tooth, an opposing portion opposing the rotor may be, in a circumferential direction about a rotation axis of the rotor, formed wider than a protruding portion in which the coil is provided and which is protruding to the side of the rotor from the yoke, wherein in the third resin molded body, in a thickness direction which faces away from the slot side surface which is orthogonal to the lamination direction, a first portion which extends along a region formed by the opposing portion of the slot side surface may be thicker than a second portion which extends along a region of the slot side surface other than the region formed by the opposing portion.

According to this, it is possible to increase the rigidity of the first portion of the third resin molded body along the region formed by the opposing portion of the slot side surface. It is possible to retain the conducting wire forming the coil in the slot. For example, it is possible to suppress the conducting wire which forms the coil from falling out from a slot opening portion formed between the opposing portions of adjacent teeth that are facing each other.

In the first slot side portion, a first cutout portion may be formed to a portion which overlaps with the end portion of the first side of the lamination direction of the third resin molded body, wherein in the second slot side portion, a second cutout portion may be formed to a portion which overlaps with the end portion of the second side of the lamination direction of the third resin molded body, wherein in the end portion of the first side of the lamination direction of the third resin molded body, a third cutout portion may be formed to a portion which overlaps with the first slot side portion, wherein in the end portion of the second side of the lamination direction of the third resin molded body, a fourth cutout portion may be formed to a portion which overlaps with the second slot side portion, wherein the first slot side portion may overlap, in a state in which the first cutout portion and the third cutout portion are joined, with the end portion of the first side of the lamination direction of the third resin molded body, wherein the second slot side portion may overlap, in a state in which the second cutout portion and the fourth cutout portion are joined, with the end portion of the second side of the lamination direction of the third resin molded body.

According to this, it is possible to suppress to increase each thickness where the first slot side portion and the third resin molded body overlaps and where the second slot side portion and the third resin molded body overlaps. As described above, the structure where the first cutout portion and the third cutout portion are joined and the structure where the second cutout portion and the fourth cutout portion are joined are called "straight scarf joint" in some instance. "Jointing" is interpreted broadly. For example, it includes a structure where two resin molded bodies which are jointing objects are, in a separable state, hooked at each cutout portions. The two resin molded bodies which are objects may be structured in an integral structure, for example, adhered or the like.

Advantageous Effects of the Invention

According to the present invention, it is possible to obtain a rotary machine that includes a stator having a structure which can smoothly form an insulating portion that secures an electrical insulation of a stator core and a coil.

DESCRIPTION OF EMBODIMENTS

Embodiments for carrying out the present invention will be described with reference to the drawings. The present invention is not limited to the configurations described below, and various configurations can be employed based on the same technical idea. For example, a part of the configurations shown below may be omitted or may be replaced by another configuration or the like. Another configuration may be included.

<Rotary Machine>

Figure 1:
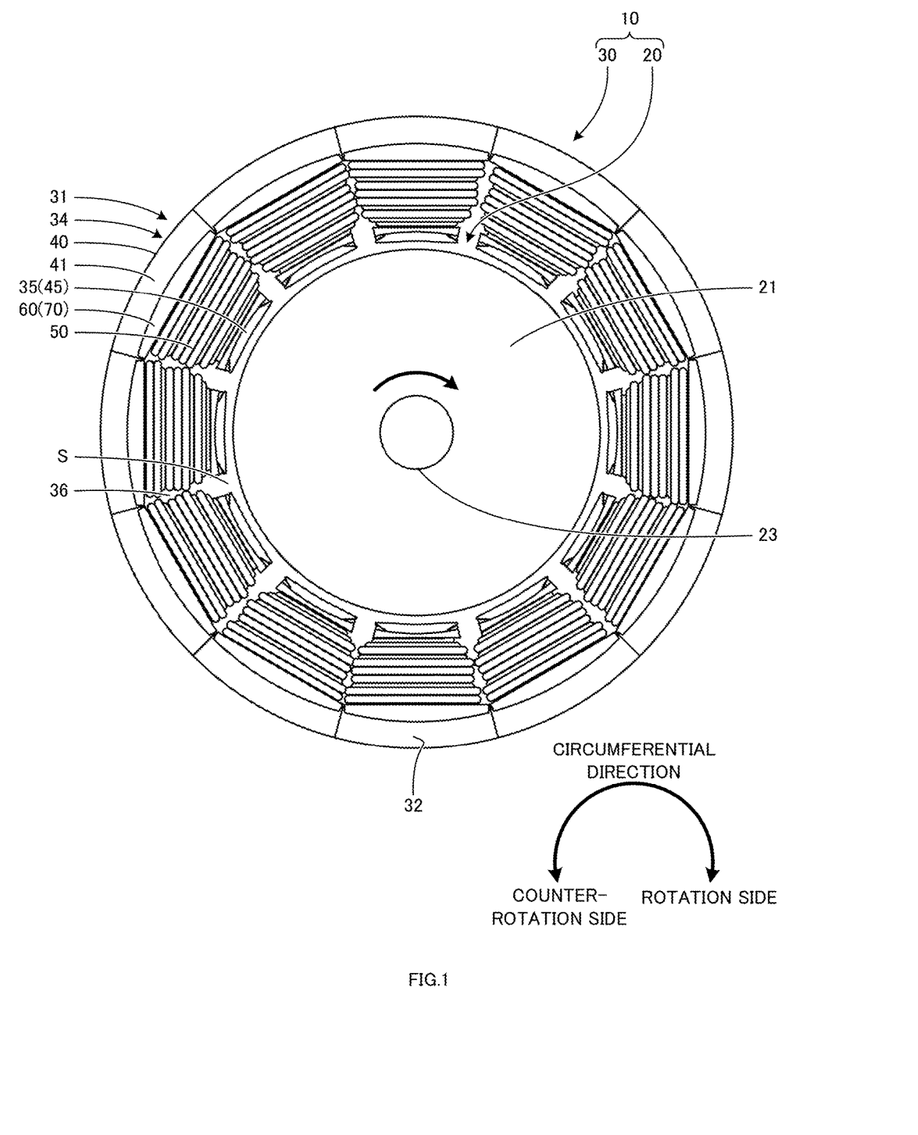
FIG. 1 is a plan view illustrating a schematic structure a rotary machine.

A rotary machine 10 is, for example, a motor or an electric generator. The rotary machine 10 like a motor or an electric generator is mounted on various products. For example, the rotary machine 10 is mounted on an electric vehicle. As the electric vehicle, an electric car, an electric bicycle, an electric wheelchair, an electric cart, or an electric food trolley are shown as examples. The electric car includes a hybrid car. When the rotary machine 10 is a motor, the rotary machine 10 is used as, for example, a power source for moving an electric vehicle. The rotary machine 10, as shown in FIG. 1, includes a rotor 20 and a stator 30.

The rotor 20 includes a rotor core 21, a plurality of permanent magnets, and a shaft 23. In FIG. 1, illustration of the permanent magnets is omitted. The rotor core 21 is formed by laminating electrical steel sheets, for example, while punching the electrical steel sheet with a press machine. The plurality of permanent magnets are mounted in the rotor core 21. For example, the plurality of permanent magnets are each housed in a plurality of spaces which are formed in the rotor core 21 and which correspond to the number of the permanent magnets. When the rotary machine 10 is a motor, the motor that includes such a rotor 20 is called an Interior Permanent Magnet (IPM) motor. The plurality of permanent magnets may be mounted to the outer peripheral surface of the rotor core 21. The motor that includes such a rotor 20 is called a Surface Permanent Magnet (SPM) motor.

The shaft 23 is secured to a through hole formed at the center portion of the rotor core 21. Bearings are attached to the shaft 23 at both sides of the rotor core 21. The bearings are supported by supporting portions provided at the stator 30. In FIG. 1, illustrations of the bearings and the supporting portions are omitted. The shaft 23 serves as the rotation axis. The rotor 20 rotates about the shaft 23 as the rotational center. The rotor 20 is similar to the rotor included in a motor or an electric generator that has been publicly known. Therefore, other descriptions related to the rotor 20 will be omitted. In the embodiment, the direction in which the rotor 20 rotates is referred to as "rotation direction". The "arrow" shown near the shaft 23 in FIG. 1 shows the rotation direction. The direction corresponding to the rotation direction is referred to as "circumferential direction". The circumferential direction is the concept that is centered to the shaft 23 which serves as the rotation axis and includes both directions of the rotation direction and the direction opposite thereto. The direction opposite to the rotation direction is referred to as "counter-rotation direction". In the rotary machine 10, the radiation direction where a center is the shaft 23 which is the rotation axis is referred to as "radial direction".

The stator 30 includes a stator core 31, a plurality of coils 50, an insulating portion 60. The stator core 31 includes, as shown in FIG. 1, a yoke 34 and a plurality of teeth 35. In the example shown in FIG. 1, the stator core 31 includes twelve teeth 35. The twelve teeth 35 are protruded from the yoke 34 toward the rotor 20 (shaft 23) side. The direction in which the teeth 35 protrude coincides with the radial direction.

Figure 2:
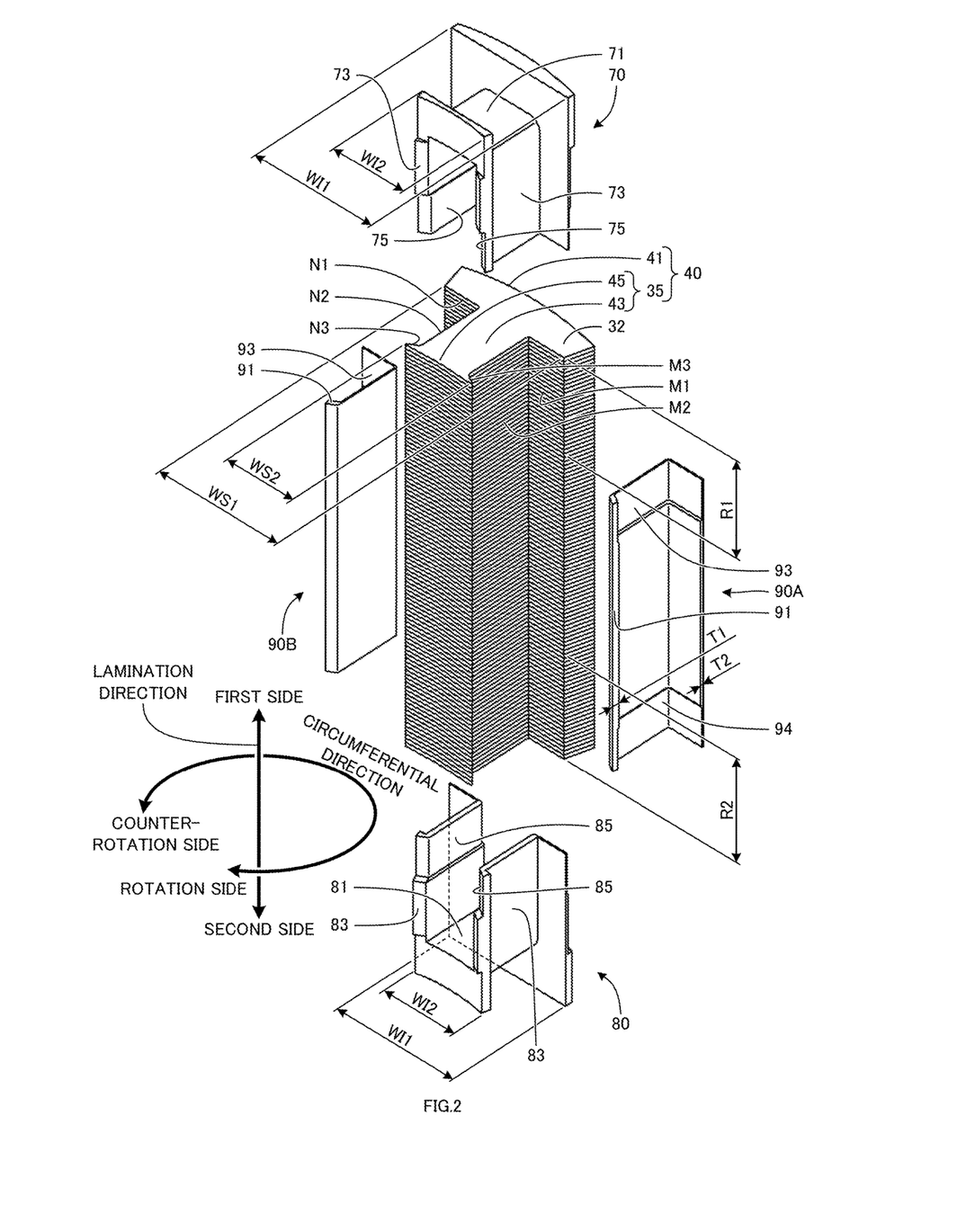
FIG. 2 is a perspective view illustrating a schematic structure of a stator core segment, a first resin molded body, a second resin molded body and a third resin molded body.

The stator core 31 is formed such that a plurality of stator core segments 40 are arranged in a ring shape (see FIGS. 1 and 2). In the embodiment, the stator core segment 40 is referred to as "segment 40". Based on FIG. 1, the stator core 31 is formed by arranging twelve segments 40 in a ring shape. The number of teeth 35 in one segment 40 is one. Therefore, twelve slots 36 are formed in the stator core 31. The slot 36 is a space formed between the teeth 35 adjacent to each other. The number of the slots of the stator 30 is properly set by taking the various conditions such as required performances into consideration.

The segment 40 includes, as shown in FIG. 2, a yoke portion 41 and the tooth 35. The segment 40 is formed by, with a press machine, punching the electrical steel sheet into a predetermined shape as shown in FIG. 2 and laminating the electrical steel sheets. In the embodiment, upon forming the segment 40, the direction in which the electrical steel sheets are laminated is referred to as "lamination direction". The lamination direction coincides with the direction in which the electrical steel sheets are laminated in the rotor core 21.

The tooth 35 includes a protruding portion 43 and an opposing portion 45. The protruding portion 43 forms a protruding part in the tooth 35 which is provided in a state where it is protruded from the yoke 34 to the rotor 20 side in the radial direction. The protruding portion 43 is provided with the coil 50. In the tooth 35, the opposing portion 45 forms a portion which oppose the rotor 20. In the circumferential direction, the opposing portion 45 is wider than the protruding portion 43.

In the embodiment, one side of the lamination direction is referred to as "first side". The other side of the lamination direction is referred to as "second side". With respect to both end surfaces of the stator core 31 in the lamination direction, the end surface of the stator core 31 on the first side of the lamination direction is referred to as "first end surface 32", and the end surface of the stator core 31 on the second side of the lamination direction is referred to as "second end surface 33" (see, for example, FIGS. 1 and 5). The second end surface 33 is the end surface of the stator core 31 which is on the opposite side of the first end surface 32 in the lamination direction. The first end surface 32 of the stator core 31 is formed by an end surface of the first side of the lamination direction of the segment 40. The second end surface 33 of the stator core 31 is formed by an end surface of the second side of the lamination direction of the segment 40. Thus, in the embodiment, the first end surface 32 is the concept including the end surface of the segment 40 in the first side of the lamination direction. The second end surface 33 is the concept including an end surface of the segment 40 in the second side of the lamination direction. The end surface of the segment 40 in the first side of the lamination direction includes each end surface of the yoke portion 41 and the tooth 35 on the same side. The end surface of the segment 40 in the second side of the lamination direction includes each end surface of the yoke portion 41 and the tooth 35 on the same side.

Figure 3:
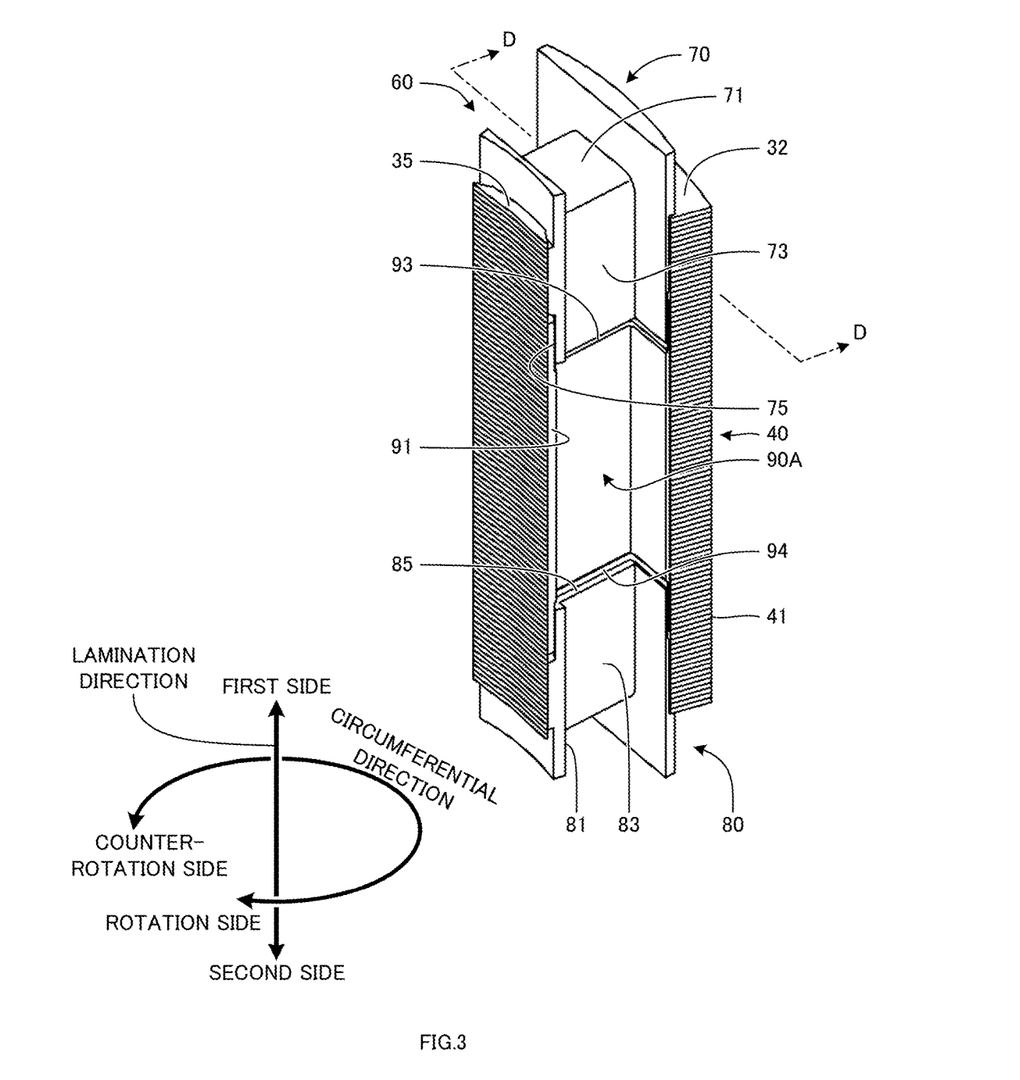
FIG. 3 is perspective view illustrating a schematic structure of the stator core segment covered by an insulating portion.
Figure 4:
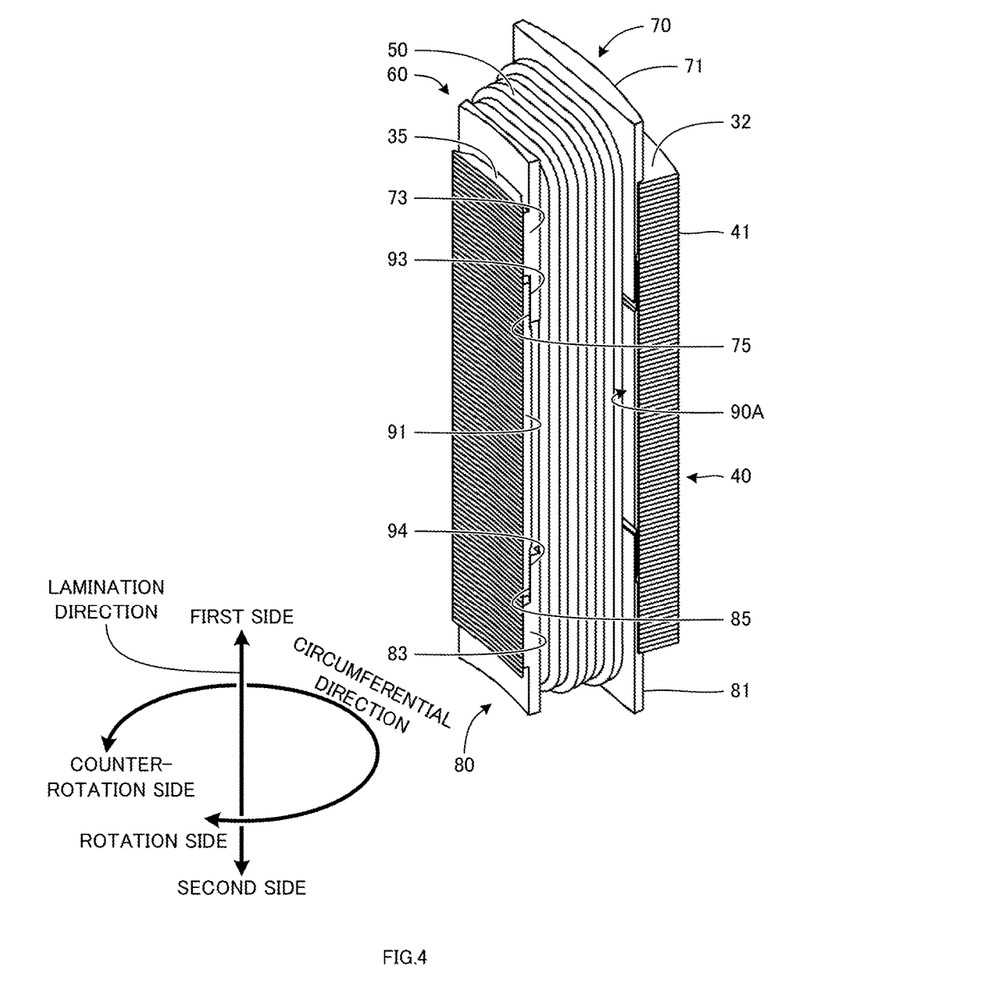
FIG. 4 is a perspective view illustrating a schematic structure of the stator core segment of a coil formed thereto.

The coil 50 provided to the protruding portion 43 of the tooth 35 is, except a coil end portion, housed in the slot 36 (see FIG. 1). The coil 50 is formed by winding a conducting wire around the protruding portion 43 of the tooth 35. For example, the coil 50 is formed by, as shown in FIGS. 1 and 4, concentratedly winding the conducting wire to the protruding portion 43 of the tooth 35. The coil 50 is formed by, against the segment 40, using a predetermined winding machine. When forming the coil 50, the segment 40 is, as shown in FIG. 3, covered by the insulating portion 60. According to the insulating portion 60, it is possible to secure electrical insulation between the segment 40 (the stator core 31) and the coil 50. Descriptions of the insulating portion 60 will be described later.

The plurality of coils 50 are respectively categorized into any of U-phase, V-phase and W-phase coils 50. Each phase of the coils 50 are wire connected in a predetermined manner. For example, each phase of the coils 50, are star connected. For forming the coil 50 to the segment 40 and for the wire connection after forming the coil 50, a publicly known wire winding technology and wire connecting technology can be employed. Therefore, other descriptions related to the above will be omitted.

The plurality of segments 40 are arranged in a ring shape. At this time, in the segment 40, the coil 50 are formed in the protruding portion 43 via the insulating portion 60 (see FIG. 4). In the segment 40, a concave portion may be formed on one side in the circumferential direction of the yoke portion 41 and a convex portion may be formed on the other side. When arranging the plurality of segments 40 in the ring shape, the concave portions and the convex portions which are each formed on the yoke portions 41 of the adjacent segments 40 are fitted. The plurality of segments 40 are arranged in the ring shape by fitting the concave portions and the convex portions. The plurality of segments 40 arranged in the ring shape are fixed in a predetermined method to maintain the ring shape state. For example, the plurality of segments 40 are, after being wire connected, arranged in a ring shape in a die for resin molding and are resin molded. According to this, in the stator 30, a molded portion is formed of resin that was injected and filled into the die. The stator 30 is in a state of being covered by the molded portion. As the resin to form the molded portion, Bulk Molding Compound (BMC) is shown as an example. When the rotary machine 10 is a motor, the motor having such a stator 30 is called a molded motor. In FIG. 1, illustration of the molded portion is omitted.

To form the stator core which the stator includes by the divided plurality of segments is a publicly known technology. The stator core 31 in the stator 30 is, for example, realized by such publicly known dividing core technology. The configuration to mold the stator is also a publicly known technology. The stator 30 which is molded is, for example, realized by such publicly known molding technology. Therefore, other descriptions relating to these technologies will be omitted.

<Insulating Portion>

The insulating portion 60 is, as shown in FIGS. 2 and 3, formed by assembling a first resin molded body 70, a second resin molded body 80 and third resin molded bodies 90A, 90B. The first resin molded body 70, the second resin molded body 80 and the third resin molded bodies 90A, 90B are formed by resin molding. In the resin molding, dies that are each formed with cavities corresponding to the shapes of the resin molded bodies which are molding objects are used.

The first resin molded body 70 is attached to the segment 40 on the first side of the lamination direction (see FIGS. 2 and 3). The first resin molded body 70 includes a first end surface side portion 71 and first slot side portions 73. The first end surface side portion 71 covers the first end surface 32 in a state with the first resin molded body 70 is attached to the segment 40. The first end surface side portion 71 is formed as a wall-shape with parts on both sides in the radial direction are each upstanding to the first side of the lamination direction (see FIG. 2). In the first end surface side portion 71, the wall-shaped portion on the side of the yoke portion 41 and the wall-shaped portion on the side of the opposing portion 45 are aligned in the radial direction at a predetermined interval. The wall-shaped portion on the side of the yoke portion 41 is made to be width WI1 which corresponds to width WS1 of the yoke portion 41. The wall-shaped portion on the side of the opposing portion 45 is made to be width WI2 which corresponds to width WS2 of the opposing portion 45. The two wall-shaped portions support the coil end portion of the coil 50 on the first side of the lamination direction from the radial direction (see FIGS. 1 and 4).

The first slot side portions 73 are integrally made with the first end surface side portion 71 on either side of the first end surface side portion 71 in the circumferential direction. The first slot side portions 73 cover first regions R1 on either side in the circumferential direction, respectively. The first region R1 is a partial region in the lamination direction of the slot side surface which forms the slot 36 and is a region of the first side in the lamination direction which continues to the first end surface 32 (see FIGS. 2 and 5). The slot side surfaces are formed by side surfaces M1, M2, M3 and side surfaces N1, N2, N3 of the two adjacent segments 40.

Therefore, in the first slot side portions 73 which are provided on both sides in the circumferential direction, the first slot side portion 73 on the side of the rotation direction covers the first region R1 made by the side surfaces M1, M2, M3. In the first slot side portions 73 which are provided on both sides in the circumferential direction, the first slot side portion 73 on the side of the counter-rotation direction covers the first region R1 made by the side surfaces N1, N2, N3. In the embodiment, the "side of the rotation direction" is referred to as of "rotation side". The "side of the counter-rotation direction" is referred to as "counter-rotation side".

The side surfaces M1, M2, M3 are the side surfaces of the segment 40 of the rotation side with the teeth 35 as a reference. The side surface M1 is a side surface of an inner peripheral side of the yoke portion 41. The side surface M2 is a side surface of the protruding portion 43. The side surface M3 is a side surface of an outer peripheral side of the opposing portion 45. The side surfaces N1, N2, N3 are side surfaces of the segment 40 of the counter-rotation side with the teeth 35 as a reference. The side surface N1 is a side surface of the inner peripheral side of the yoke portion 41. The side surface N2 is a side surface of the protruding portion 43. The side surface N3 is a side surface of the outer peripheral side of the opposing portion 45. In the embodiment, the "inner peripheral side" is the side facing toward the shaft 23 in the radial direction. The "outer peripheral side" is the side facing away from the shaft 23 in the radial direction.

The second resin molded body 80 is attached to the segment 40 on the second side of the lamination direction (see FIGS. 2 and 3). The second resin molded body 80 includes a second end surface side portion 81 and second slot side portions 83. The second end surface side portion 81 covers the second end surface 33 in a state with the second resin molded body 80 is attached to the segment 40. The second end surface side portion 81 is formed as a wall-shape with parts on both sides in the radial direction are each upstanding to the second side of the lamination direction (see FIG. 2). In the second end surface side portion 81, the wall-shaped portion on the side of the yoke portion 41 and the wall-shaped portion on the side of the opposing portion 45 are aligned in the radial direction at a predetermined interval. The wall-shaped portion on the side of the yoke portion 41 is made to be width WI1 which corresponds to width WS1 of the yoke portion 41. The wall-shaped portion on the side of the opposing portion 45 is made to be width WI2 which corresponds to width WS2 of the opposing portion 45. The two wall-shaped portions support the coil end portion of the coil 50 on the second side of the lamination direction from the radial direction (see FIG. 4).

The second slot side portions 83 are integrally made with the second end surface side portion 81 on either side of the second end surface side portion 81 in the circumferential direction. The second slot side portions 83 cover second regions R2 on either side in the circumferential direction, respectively. The second region R2 is a partial region in the lamination direction of the slot side surface and is a region of the second side in the lamination direction which continues to the second end surface 33 (see FIGS. 2 and 5). In the second slot side portions 83 which are provided on both sides in the circumferential direction, the second slot side portion 83 on the rotation side covers the second region R2 made by the side surfaces M1, M2, M3. In the second slot side portions 83 which are provided on both sides in the circumferential direction, the second slot side portion 83 on the counter-rotation side covers the second region R2 made by the side surfaces N1, N2, N3. The first resin molded body 70 and the second resin molded body 80 may be the same resin molded body regarding the shape.

The third resin molded body 90A has a shape along the slot side surface on the rotation side with the teeth 35 as a reference. Based on one segment 40, the third resin molded body 90A has a shape along the side surfaces M1, M2, M3 which continues in the rotation side with the teeth 35 as a reference (see FIG. 2). The third resin molded body 90A is provided in a state of contacting with a predetermined region of the slot side surface which includes the center portion of the segment 40 (the stator core 31) in the lamination direction.

The third resin molded body 90B has a shape along the slot side surface on the counter-rotation side with the teeth 35 as a reference. Based on one segment 40, the third resin molded body 90B has a shape along the side surfaces N1, N2, N3 which continues in the counter-rotation side with the teeth 35 as a reference (see FIG. 2). The third resin molded body 90B is provided in a state of contacting with a predetermined region of the slot side surface which includes the center portion of the segment 40 (the stator core 31) in the lamination direction.

The third resin molded bodies 90A, 90B include a first portion 91 and a second portion. In each of the third resin molded bodies 90A, 90B, the first portion 91 is a portion along a region formed by the opposing portion 45 of the slot side surface. In other words, the first portion 91 of the third resin molded body 90A is a portion along the side surface M3. The first portion 91 of the third resin molded body 90B is a portion along the side surface N3. In each of the third resin molded bodies 90A, 90B, the second portion is a portion other than the first portion 91. In other words, the second portion of the third resin molded body 90A is a portion along the side surfaces M1, M2 other than the side surface M3. The second portion of the third resin molded body 90B is a portion along the side surfaces N1, N2 other than the side surface N3. In the third resin molded bodies 90A, 90B, thickness T1 of the first portion 91 is made to be thicker than thickness T2 of the second portion (thickness T1>thickness T2). The thickness T1 of the first portion 91 and the thickness T2 of the second portion are thickness dimensions in a thickness direction. The thickness direction is the direction facing away from the slot side surface which is orthogonal to the lamination direction.

Figure 5:
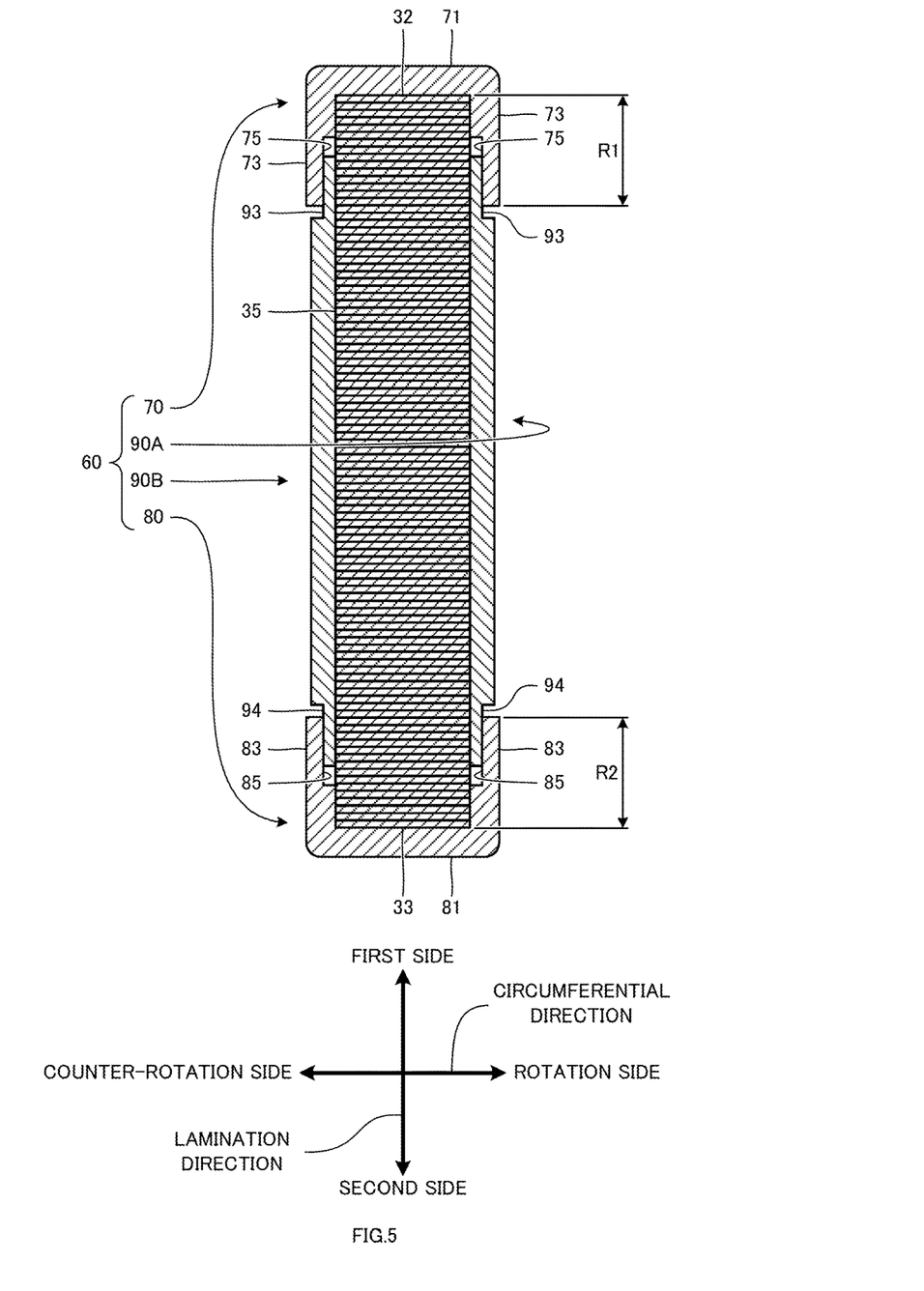
FIG. 5 is an end view taken along line D-D of FIG. 3.

The third resin molded bodies 90A, 90B may have the shape of the first side and the shape of the second side in a plane-symmetric shape about the center of the lamination direction with the center as a reference (see FIGS. 2 and 5). In this case, the third resin molded bodies 90A, 90B can be realized by one type of a resin molded body having the same shape. However, the third resin molded bodies 90A, 90B may have different shapes from the shapes described previously.

The attachment of the first resin molded body 70, the second resin molded body 80 and the third resin molded bodies 90A, 90B to the segment 40 is performed as follows. First, the third resin molded bodies 90A, 90B, respectively, are arranged in a state of contacting with the slot side surfaces. At this time, as described above, the third resin molded bodies 90A, 90B are, in each slot side surface of the rotation side and the counter-rotation side, arranged in a predetermined region including the center portion of the lamination direction, respectively.

Next, the first resin molded body 70 and the second resin molded body 80 are attached to the segment 40 to which the third resin molded bodies 90A, 90B are arranged on the slot side surfaces. That is, the first resin molded body 70 is attached on the first side of the lamination direction. The second resin molded body 80 is attached on the second side of the lamination direction. Associated with the attachment of the first resin molded body 70, the first slot side portion 73 of the rotation side overlaps, in the region of the second side in the lamination direction of the first region R1, with an end portion of the first side in the lamination direction of the third resin molded body 90A (see FIG. 5). Similarly, the first slot side portion 73 of the counter-rotation side overlaps, in the region of the second side in the lamination direction of the first region R1, with the end portion of the first side in the lamination direction of the third resin molded body 90B (see FIG. 5).

Associated with the attachment of the second resin molded body 80, the second slot side portion 83 of the rotation side overlaps, in the region of the first side in the lamination direction of the second region R2, with an end portion of the second side in the lamination direction of the third resin molded body 90A (see FIG. 5). Similarly, the second slot side portion 83 of the counter-rotation side overlaps, in the region of the first side in the lamination direction of the second region R2, with the end portion of the second side of the lamination direction of the third resin molded body 90B (see FIG. 5). Accordingly, the third resin molded bodies 90A, 90B are, on the first side of the lamination direction, clamped by the slot side surfaces and the first slot side portions 73. The third resin molded bodies 90A, 90B are, on the second side of the lamination direction, clamped by the slot side surfaces and the second slot side portions 83.

Explanation has been omitted in the above description, however, in the first slot side portions 73, first cutout portions 75 are formed at the portions overlapping with end portions on the first side of the lamination direction of the third resin molded bodies 90A, 90B (see FIGS. 2 and 5). In the second slot side portions 83, second cutout portions 85 are formed at the portions overlapping with the end portions on the second side of the lamination direction of the third resin molded bodies 90A, 90B (see FIGS. 2 and 5). In the end portions on the first side of the lamination direction of the third resin molded bodies 90A, 90B, third cutout portions 93 are formed at the portions overlapping with the first slot side portions 73 (see FIGS. 2 and 5). In the end portions on the second side of the lamination direction of the third resin molded bodies 90A, 90B, fourth cutout portions 94 are formed at the portions overlapping with the second slot side portions 83 (see FIGS. 2 and 5).

The first resin molded body 70, the second resin molded body 80 and the third resin molded bodies 90A, 90B are attached to the segment 40 (see FIG. 3). In the state shown in FIG. 3, the first slot side portions 73 and the third resin molded bodies 90A, 90B overlap as follows. That is, the first slot side portions 73 and the third resin molded bodies 90A, 90B overlap, in the region on the second side of the lamination direction of the first region R1, with the first cutout portions 75 and the third cutout portions 93 in a joint state (see FIG. 5). In the state shown in FIG. 3, the second slot side portions 83 and the third resin molded bodies 90A, 90B overlap as follows. That is, the second slot side portions 83 and the third resin molded bodies 90A, 90B overlap, in the region on the first side of the lamination direction of the second region R2, with the second cutout portions 85 and the fourth cutout portions 94 in a joint state (see FIG. 5). The joint structure, as shown in FIG. 5, is also called as "straight scarf joint".

Advantageous Effects of Embodiment

According to the embodiment, it is possible to obtain the following effects.

(1) The insulating portion 60 is formed by assembling the first resin molded body 70, the second resin molded body 80 and the third resin molded bodies 90A, 90B which are formed by resin molding (see FIGS. 2 and 3). Therefore, it is possible to improve the rigidity of the third resin molded bodies 90A, 90B. When attaching the first resin molded body 70, the second resin molded body 80 and the third resin molded bodies 90A, 90B to the segment 40, it is possible to suppress bending and/or flipping up and the like of the third molded bodies 90A, 90B. The third resin molded bodies 90A, 90B are arranged in a state of contacting with the segment 40 which forms the stator core 31. Then, the first resin molded body 70 is attached on the first side of the lamination direction and the second resin molded body 80 is attached on the second side of the lamination direction. It is possible to smoothly attach the first resin molded body 70 and the second resin molded body 80 to the segment 40. The stator 30 can be a structure which can smoothly form the insulating portion 60.

By varying the dimension in the lamination direction of the third resin molded bodies 90A, 90B, it is possible to correspond to multiple specifications occurred by differences of laminating-thickness or variations of laminating-thickness of the stator core 31 (the segment 40). The first resin molded body 70 and the second resin molded body 80 can be employed commonly regardless of the laminating-thickness of the stator core 31. The laminating-thickness of the stator core 31 (the segment 40) is the dimension of the stator core 31 (the segment 40) in the lamination direction.

(2) The thickness T1 of the first portions 91 of the third resin molded bodies 90A, 90B were made to be thicker than the thickness T2 of the second portions which are portions other than the first portions 91 (thickness T1>thickness T2, see FIG. 2). Therefore, the rigidity of the first portions 91 of the third resin molded bodies 90A, 90B can be enhanced. Even in a state in which space factor is enhanced, it is possible to retain the conducting wires which form the coil 50 inside the slot 36. For example, it is possible to suppress the conducting wires which form the coil 50 from dropping out from a slot opening portion S. The slot opening portion S is, as shown in FIG. 1, a gap formed between the opposing portions 45 facing each other at the adjacent teeth 35.

In the embodiment, in the state in which the first resin molded body 70, the second resin molded body 80 and the third resin molded bodies 90A, 90B are attached to the segment 40, the rigidity of the portion of the insulating portion 60 along the side surfaces M3, N3 is enhanced. That is, along with the first portions 91 of the third resin molded bodies 90A, 90B described above, the following configuration is also employed to the first slot side portions 73 of the first resin molded body 70 and the second slot side portions 83 of the second resin molded body 80. At the first slot side portions 73 and the second slot side portions 83, the thickness of each portion of the first resin molded body 70 and the second resin molded body 80 which continues with the first portions 91 in the lamination direction along the side surfaces M3, N3 is thicker than the portion along the side surfaces M1, M2 and side surfaces N1, N2 (see FIGS. 2 and 3). With the entire stator 30, it is possible to retain the conducting wires which form the coil 50 inside the slot 36.

(3) The first slot side portions 73 and the third resin molded bodies 90A, 90B are overlapped (see FIG. 5). Therefore, it is possible to extend the insulation distance by the overlapped portions. The second slot side portions 83 and the third resin molded bodies 90A, 90B are overlapped (see FIG. 5). Therefore, it is possible to extend the insulation distance by the overlapped portions. The first resin molded body 70, the second resin molded body 80 and the third resin molded bodies 90A, 90B are configured as follows. That is, to the first slot side portions 73 of the first resin molded body 70, the first cutout portions 75 are formed (see FIGS. 2 and 5). To the second slot side portions 83 of the second resin molded body 80, the second cutout portions 85 are formed (see FIGS. 2 and 5). To each of the end portions on both sides in the lamination direction of the third resin molded bodies 90A, 90B, the third cutout portion 93 and the fourth cutout portion 94 are formed, respectively (see FIGS. 2 and 5). The first resin molded body 70, the second resin molded body 80 and the third resin molded bodies 90A, 90B are attached to the segment 40 (see FIG. 3). At this time, the first cutout portions 75 and the third cutout portions 93 are overlapped in a joined state (see FIG. 5). The second cutout portions 85 and the fourth cutout portions 94 are overlapped in a joined state (see FIG. 5). Therefore, it is possible to suppress an increase in thickness of the portions where the first slot side portions 73 and the third resin molded bodies 90A, 90B overlap. It is possible to suppress an increase in thickness of the portions where the second slot side portions 83 and the third resin molded bodies 90A, 90B overlap.

<Modification>

The embodiments may also be configured as follows. Even in the case where the following configurations are employed, the same advantageous effects as the above-described advantageous effects can be obtained. Each configuration described below can also be appropriately employed in combination. In below, explanation is made to points which are different from the above-described points and explanation to the points which are similar to the above-described points will be omitted properly.

(1) In the above description, the stator core 31 which is formed by arranging the segments 40 in a ring shape has been described as an example (see FIG. 1). The stator core may be an integrated stator core. In this case, the stator core is formed by laminating electrical steel sheets while punching the electrical steel sheet into a ring shape with a yoke and a plurality of teeth integrated. In the above description, a configuration where the first resin molded body 70 and the second resin molded body 80 were divided to correspond to individual segments 40 has been described as an example (see FIG. 2). When the stator core is an integrated type, the first resin molded body and the second resin molded body may be configured in an integral ring shape to correspond to the integrated type stator core. The first resin molded body of the integral type is, for example, configured to connect the first resin molded bodies 70 described above at a position which corresponds to the yoke of the integral type stator core. The second resin molded body of the integral type is, for example, configured to connect the second resin molded bodies 80 described above at a position which corresponds to the yoke of the integral type stator core.

Figure 6:
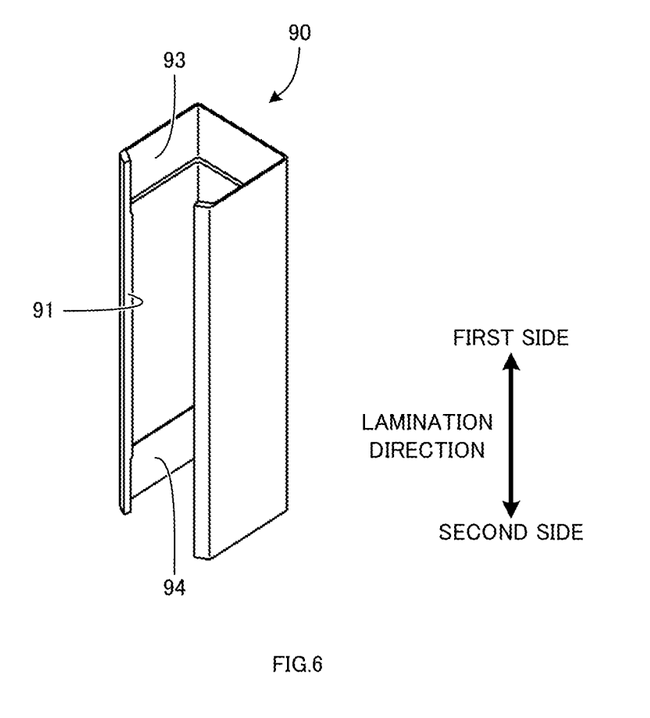
FIG. 6 is a perspective view illustrating a schematic structure of a third resin molded boy which corresponds to an integral type stator core.

In the above description, the configuration where two third resin molded bodies 90A, 90B were provided to one slot 36 has been described as an example. When the stator core is an integral type, a third resin molded body is shaped, for example, as a third resin molded body 90 which corresponds to the entire slot side surface of one slot 36 as shown in FIG. 6. The third resin molded body 90 has a shape where the position which corresponds to the slot opening portion extends along the opened slot side surface.

In the third resin molded body 90, as the third resin molded bodies 90A, 90B as described above, the first portions 91 which extend along the opposing portions of the teeth of the slot side surfaces are thicker than the second portion which extend along the slot side surface other than the first portions (see FIG. 6). On end portions of both sides in the lamination direction of the third resin molded body 90, as the third resin molded bodies 90A, 90B, a third cutout portion 93 and a fourth cutout portion 94 are formed, respectively. The first resin molded body, the second resin molded body and the third resin molded body 90 which correspond to the integral type stator core are attached to the integral type stator core. The first slot side portion of the first resin molded body and the second slot side portion of the second resin molded body overlap with each end portion on both sides in the lamination direction of the third resin molded body 90, respectively. At this time, the first cutout portion formed in the first slot side portion and the third cutout portion 93 are joined. A second cutout portion formed in the second slot side portion and the fourth cutout portion 94 are joined.

(2) In the above description, the rotary machine 10 of an inner rotation type which has the rotor 20 rotatably supported in the inner peripheral side of the stator 30 has been described as an example (see FIG. 1). An insulation structure similar to the insulating portion 60 can also be employed in a stator of an outer rotation type rotary machine. In the stator of the outer rotation type rotary machine, a plurality of teeth are protruded to the outside from a yoke in a radial direction. A rotor of the outer rotation type rotary machine is, in the outside of the stator, opposed to the plurality of teeth. Between the adjacent teeth, slots are formed. A first resin molded body and a second resin molded body in the insulating portion having the same insulation structure of the insulating portion 60 is shaped to correspond to the stator core of the stator of the outer rotation type rotary machine. A third resin molded body is shaped to extend along a slot side surface which form the slots of the stator core. The third resin molded body is provided in a state of contacting with a predetermined region of the slot side surface including the center portion of the stator core in the lamination direction. The first resin molded body and the second resin molded body are, at both sides in a lamination direction, attached to the stator core, respectively. Other descriptions relating to the outer rotation type rotary machine which employs the insulation structure as same as the insulating portion 60 will be omitted.

DESCRIPTION OF REFERENCE SIGNS

10: Rotary machine
20: Rotor
21: Rotor core
23: Shaft
30: Stator
31: Stator core
32: First end surface
33: Second end surface
34: York
35: Tooth
36: Slot
40: Segment
41: Yoke portion
43: Protruding portion
45: Opposing portion
50: Coil
60: Insulating portion
70: First resin molded body
71: First end surface side portion
73: First slot side portion
75: First cutout portion
80: Second resin molded body
81: Second end surface side portion
83: Second slot side portion
85: Second cutout portion
90, 90A, 90B: Third resin molded body
91: First portion
93: Third cutout portion
94: Fourth cutout portion
M1, M2, M3, N1, N2, N3: Side surface
R1: First region
R2: Second region
S: Slot opening portion
T1, T2: Thickness
WI1, WI2, WS1, WS2: Width

The invention claimed is:
1. A rotary machine, comprising:
a rotor; and
a stator,
wherein the stator includes:
a stator core which is formed by laminating steel sheets, and which includes a ring shaped yoke and a plurality of teeth protruding from the yoke to a side of the rotor;
a plurality of coils which are provided to each of the plurality of teeth and are housed in a slot formed between adjacent teeth of the plurality of teeth;
a first resin molded body which is attached to the stator core on a first side of a lamination direction in which the steel sheets are laminated, the first resin molded body electrically insulates the stator core and the coils;
a second resin molded body which is attached to the stator core on a second side of the lamination direction, the second resin molded body electrically insulates the stator core and the coils, and
a third resin molded body which has a shape extending along a slot side surface which forms the slot, the third resin molded body is provided in a state of contacting with a predetermined region of the slot side surface including a center portion of the stator core in the lamination direction, the third resin molded body electrically insulates the stator core and the coils,
wherein in each tooth, an opposing portion opposing the rotor is, in a circumferential direction about a rotation axis of the rotor, formed wider than a protruding portion in which the coil is provided and which is protruding to the side of the rotor from the yoke,
wherein the first resin molded body includes:
a first end surface side portion covering a first end surface of the stator core which is the first side of the lamination direction; and
a first slot side portion integrated with the first end surface side portion and is covering a first region of the first side of the lamination direction continuing to the first end surface, the first region is a portion in the lamination direction of the slot side surface, wherein the second resin molded body includes:
a second end surface side portion covering a second end surface of the stator core which is the second side of the lamination direction; and
a second slot side portion integrated with the second end surface side portion and is covering a second region of the second side of the lamination direction continuing to the second end surface, the second region is a portion in the lamination direction of the slot side surface, wherein the first slot side portion overlaps with an end portion of the first side of the lamination direction of the third resin molded body, wherein the second slot side portion overlaps with an end portion of the second side of the lamination direction of the third resin molded body, and wherein in the third resin molded body, in a thickness direction which faces away from the slot side surface and which is orthogonal to the lamination direction, a first portion which contact a region formed by the opposing portion of the slot side surface including the center portion of the stator core is thicker than a second portion which contacts a region of the slot side surface including the center portion of the stator core other than the region formed by the opposing portion.

2. The rotary machine according to claim 1, wherein in the first slot side portion, a first cutout portion is formed to a portion which overlaps with the end portion of the first side of the lamination direction of the third resin molded body, wherein in the second slot side portion, a second cutout portion is formed to a portion which overlaps with the end portion of the second side of the lamination direction of the third resin molded body, wherein in the end portion of the first side of the lamination direction of the third resin molded body, a third cutout portion is formed to a portion which overlaps with the first slot side portion, wherein in the end portion of the second side of the lamination direction of the third resin molded body, a fourth cutout portion is formed to a portion which overlaps with the second slot side portion, wherein the first slot side portion overlaps, in a state in which the first cutout portion and the third cutout portion are joined, with the end portion of the first side of the lamination direction of the third resin molded body, wherein the second slot side portion overlaps, in a state in which the second cutout portion and the fourth cutout portion are joined, with the end portion of the second side of the lamination direction of the third resin molded body.

\* \* \* \* \*